(12) United States Patent
Takagi

(10) Patent No.: US 6,760,141 B2
(45) Date of Patent: Jul. 6, 2004

(54) SEMICONDUCTOR OPTICAL MODULATOR AND SEMICONDUCTOR OPTICAL DEVICE

(75) Inventor: Kazuhisa Takagi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/464,450

(22) Filed: Jun. 19, 2003

(65) Prior Publication Data

US 2004/0001243 A1 Jan. 1, 2004

(51) Int. Cl.$^7$ ................................................ G02F 1/035

(52) U.S. Cl. ........................................ 359/248; 359/249

(58) Field of Search .................................. 359/248, 245, 359/240, 249, 250, 252; 385/1; 257/21, 14, 428; 372/12, 26

(56) References Cited

U.S. PATENT DOCUMENTS 6,411,421 B1 * 6/2002 Murai ........................ 359/248

* cited by examiner

Primary Examiner—Georgia Epps
Assistant Examiner—Richard Hanig
(74) Attorney, Agent, or Firm—Leydig, Voit & Mayer, Ltd.

(57) ABSTRACT

An electroabsorption semiconductor optical modulator includes a light absorption layer for generating a modulated light beam by absorbing an incident light beam. A well layer in the light absorption layer, accumulates charge carriers generated by the light absorption layer. The charge carriers are guided and released from the well layer upon receipt of an incident excitation light beam having a wavelength corresponding to the bandgap energy of the well layer. The incident light beam is modulated by changes in absorption coefficient in response to an externally applied voltage. The modulator responds to a high-intensity incident light beam at high frequency, free from deterioration of extinction characteristics, and has good transmission characteristics.

8 Claims, 13 Drawing Sheets

SEMICONDUCTOR OPTICAL MODULATOR AND SEMICONDUCTOR OPTICAL DEVICE

BACKGROUND OF THE INVENTION

1. Field of the Invention

The present invention relates to a semiconductor optical modulator for use in an optical communication system requiring a high speed operation, and in particular to a semiconductor optical modulator having a function of guiding and releasing carriers accumulated in a light absorption layer by applying excitation light and a semiconductor optical device having such a semiconductor optical modulator and a semiconductor laser integrated on the same substrate.

2. Description of the Related Art

In recent years, enormous volumes of data in communications have been transmitted through high-performance information and communication instruments so that it becomes essential to popularize widespread optical communication networks using optical fibers. In the optical communication networks, high-speed semiconductor lasers or the like are used as key devices thereof, and semiconductor optical modulators are also used for modulating input light beams generated by the semiconductor lasers. Hereinafter, an assembly structure of a combination of semiconductor optical elements, including such as a semiconductor laser and a semiconductor optical modulator, integrated on the same substrate is called a "semiconductor optical device."

Generally, in the intrinsic absorption of light in a semiconductor, electrons and holes are created from photons when the photon energy hv is greater than the bandgap Eg. The intrinsic absorption edge corresponding to the long-wavelength side Eg of the intrinsic absorption band can be shifted toward a longer wavelength by application of a high electric field to the semiconductor, which is called "Franz-Keldysh effect".

In an optical modulator using a semiconductor material, an absorption coefficient or refraction index can be significantly changed by the Franz-Keldysh effect or quantum confined Stark effect. In this case, each optical modulator shares the same type of material with each light-emitting device so that it can be integrated into a small high-efficiency modulator for external light. In addition, such an optical modulator has achieved a high speed operation in a certain modulation frequency band to a degree as achieved by a dielectric optical modulator.

In an electroabsorption type optical modulator, the amount of carriers comprised of pairs of electrons and holes (referred to as "electron and hole pair(s)", hereinafter) generated by light absorption increases in accordance with incident light intensity. The electron and hole pairs form an internal electric field so as to cancel an externally applied electric field. The screening effect on the externally applied electric field increases with the intensity level of the incident light, and there is a correlation between the intensity level of the incident light and the change in the absorption coefficient.

FIG. 14 is a schematic view showing a conventional electroabsorption type semiconductor optical modulator 100. In FIG. 14, reference numeral 101 represents an n-conductivity type InP substrate, 102 an InGaAsP light absorption layer, 103 a p-conductivity type InP cladding layer, 104 a p-conductivity type InGaAsP contact layer, 105 a SiO$_2$ insulating film, 106 a Ti/Au anode electrode, and 107 a Ti/Au cathode electrode. FIG. 15 is a schematic model showing an energy band of a portion near the light absorption layer 102. In FIG. 15, the bandgap energy is represented by E1 and the corresponding bandgap wavelength is represented by λ1 (λ1=hc/E1).

Referring to FIGS. 14 and 15, the operation of the conventional semiconductor optical modulator 100 is described below. In the optical modulator 100, continuous wavelength light (hereinafter abbreviated as "CW light") is used as a high-intensity incident light beam Lin having a wavelength of λ1, which is inputted into one facet, and a modulated output light beam Lout (λ1 in wavelength) is outputted from the other opposed facet. At the same time, an external voltage is applied in the inverse direction between the anode electrode 106 and the cathode electrode 107 in the optical modulator 100. As shown in FIG. 15, the externally applied voltage causes the Franz-Keldysh effect by which the effective bandgap energy E1 of the light absorption layer 102 is reduced and the absorption coefficient with respect to longer wavelengths than the bandgap wavelength is increased. This change in absorption coefficient by the voltage application is used for the modulation of the light intensity.

In the conventional semiconductor optical modulator 100, however, when the incident light beam has an intensity of 20 mW or more, the carriers formed of the electron and hole pairs are accumulated in a well part of the light absorption layer 102. Such accumulated carriers screen and attenuate the electric field applied to the light absorption layer 102 according to Gauss' law.

In order to reduce the carriers accumulated in the light absorption layer 102, a reverse bias voltage is applied between the anode electrode 106 and the cathode electrode 107 so that the carriers drift toward the p-InP cladding layer 103 and the n-InP substrate 101. Such carrier release, however, needs a relaxation time of about 1 ns, leading to a relatively low response speed. Thus, the conventional device involves problems of a lower extinction ratio at high frequency, a distorted light waveform, and deteriorated transmission characteristics in the optical communication system that require a high speed performance of 40 Gbit/s or so.

SUMMARY OF THE INVENTION

The present invention has been made in order to solve the above-mentioned problems. It is an object of the present invention to provide a semiconductor optical modulator which can guide and release the accumulated carriers at high speed, respond at a high frequency of 100 GHz or more, preventing deterioration of an extinction ratio, and having a high resistance to an input light as well as good transmission characteristics, even when an incident light beam having an intensity of 20 mW or more is inputted.

Another object of the present invention is to provide a semiconductor optical device including the above-mentioned semiconductor optical modulator which is monolithically integrated on the same substrate.

In order to achieve the above-mentioned objects, the present invention provides a semiconductor optical modulator of an electroabsorption type for modulating an incident light beam by use of changes in absorption coefficient under application of an external voltage. The semiconductor optical modulator comprises: an input facet for receiving the incident light beam of a first wavelength to be modulated; an output facet, which is opposed to the input facet, for outputting a modulated light beam; a light absorption layer, which is formed on a semiconductor substrate, for absorbing the incident light beam and thereby generating carriers; a carrier accumulation portion for accumulating the generated carriers; and a carrier guide and release portion having a well layer formed in the light absorption layer, for guiding and releasing the accumulated carriers outside.

The carrier guide and release portion guides and releases the carriers accumulated in the well layer upon receipt of an incident excitation light beam, of a second wavelength which corresponds to bandgap energy of the well layer.

In this configuration, the carriers are guided and released through the well layer with receipt of the excitation light beam, which allows the semiconductor optical modulator to guide and release the accumulated carriers at high speed, to respond at high frequency, preventing deterioration of an extinction ratio, with good transmission characteristics, even when an incident light beam having an intensity of 20 mW or more is input.

According to another aspect of the present invention, a semiconductor optical device includes the semiconductor optical modulator having the above-mentioned basic structure and an excitation light generating semiconductor laser for generating the excitation light beam, wherein both of the optical modulator and semiconductor laser are integrated on the same substrate.

By this arrangement, the light source for generating the excitation light beam and the optical modulator are monolithically integrated on the same substrate so that the semiconductor optical device can be reduced in size and manufacturing cost.

DETAILED DESCRIPTION OF THE PREFERRED EMBODIMENTS

Figure 1:
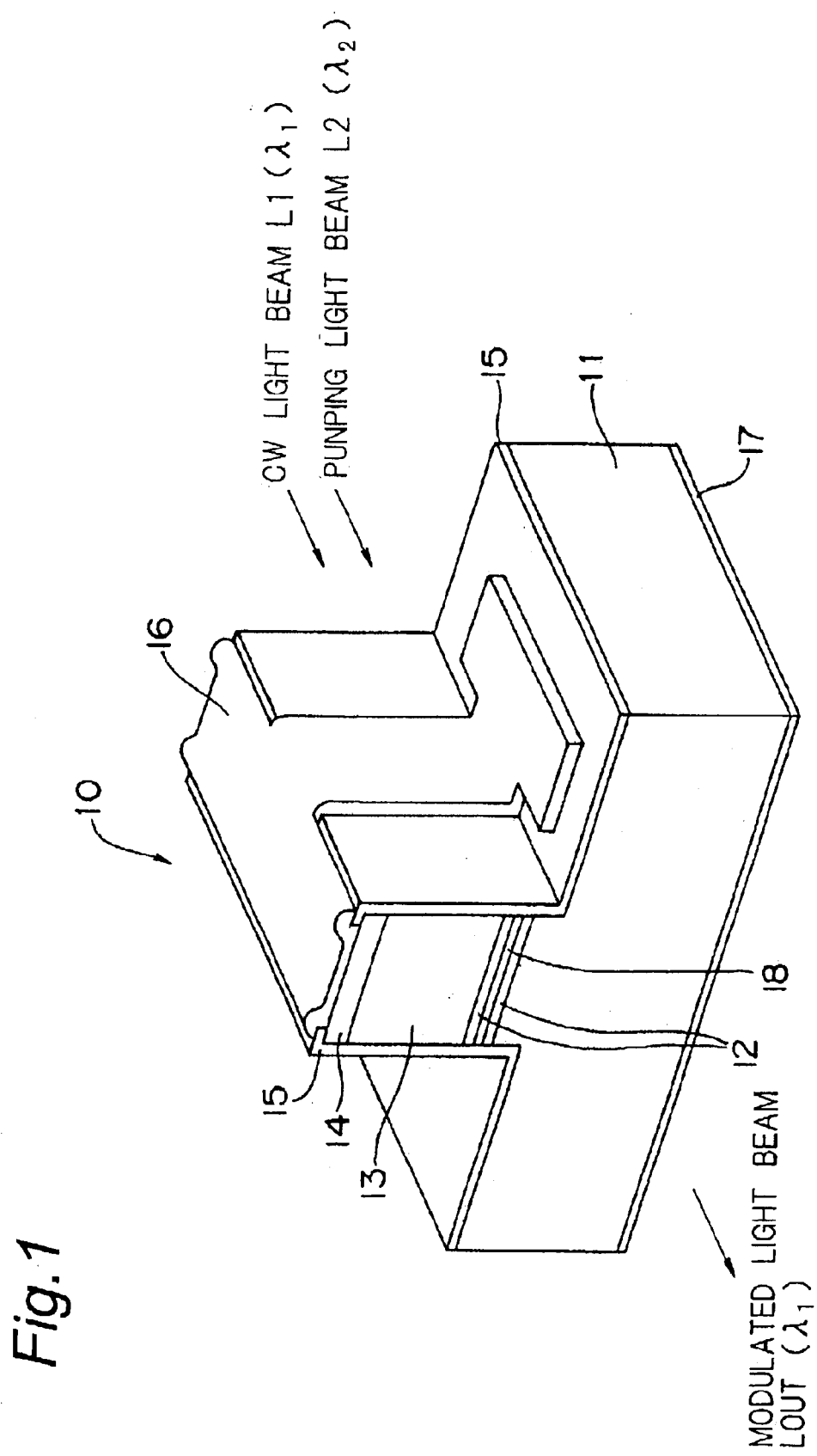
FIG. 1 is a perspective view schematically showing a structure of an electroabsorption type semiconductor optical modulator according to Embodiment 1 of the present invention.

Before the description proceeds, it is to be noted that, since the basic structures of the preferred embodiments are in common, like parts are designated by the same reference numerals throughout the accompanying drawings, and overlapped description of the elements is avoided.

Referring to FIGS. 1 to 13, embodiments of the present invention are described in detail in the following.

(Embodiment 1)

Figure 2:
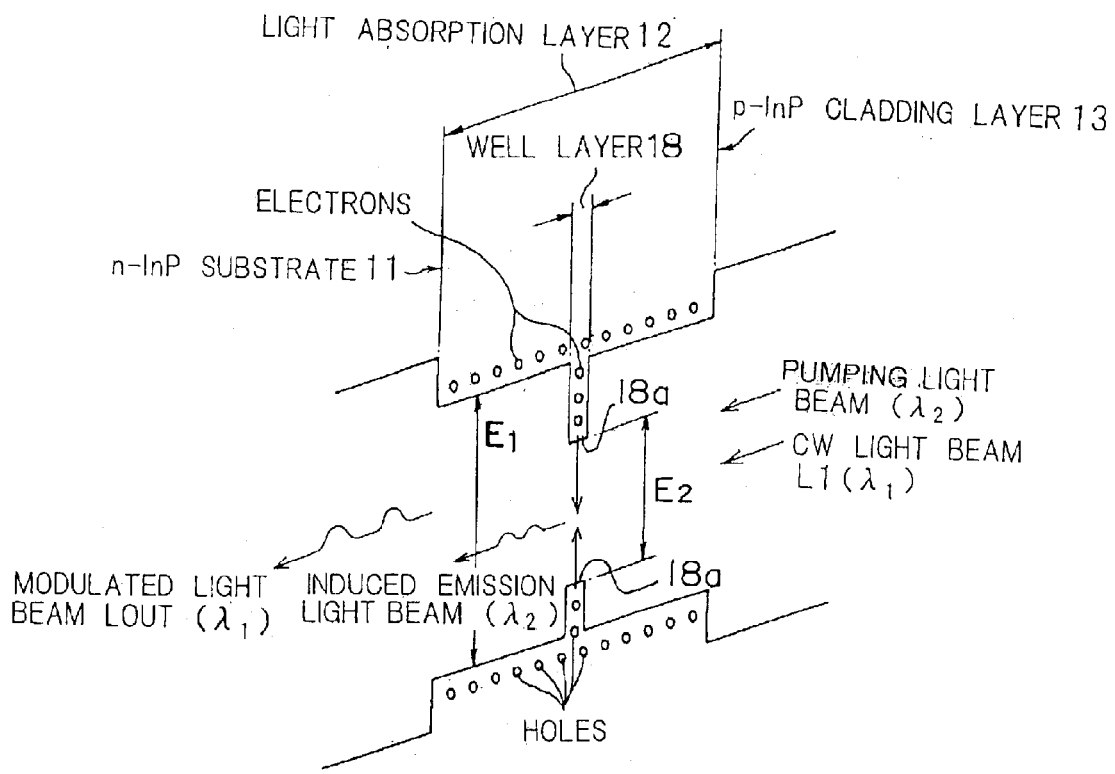
FIG. 2 is a schematic diagram showing an energy bandgap model of a portion near a light absorption layer in the electroabsorption type semiconductor optical modulator shown in FIG. 1.

Referring to FIGS. 1 and 2, Embodiment 1 of the present invention exemplified by a semiconductor optical modulator is described below. FIG. 1 is a perspective view schematically showing a structure of an electroabsorption type semiconductor optical modulator 10 according to Embodiment 1 of the present invention. In FIG. 1, reference numeral 11 represents an n-conductivity type InP substrate, 12 an InGaAsP light absorption layer of bulk crystal, 13 a p-conductivity type InP cladding layer, 14 a p-conductivity type InGaAsP contact layer, 15 a $SiO_2$ insulating film, 16 a Ti/Au anode electrode, and 17 a Ti/Au cathode electrode.

Embodiment 1 is characterized in that, for example, a non-doped InGaAsP well layer 18 is formed in the light absorption layer 12 and the bandgap energy of the well layer 18 is made smaller than that of the light absorption layer 12. In this construction, a CW light beam L1 having a wavelength of $\lambda_1$ and an excitation light beam L2 (hereinafter, referred to as a "pumping light beam") are both inputted to the same incident facet of the optical modulator 10 at the same time. The pumping light beam L2 has a wavelength of $\lambda_2$ corresponding to the bandgap energy of the well layer 18.

FIG. 2 is a schematic diagram showing an energy bandgap model of a portion near the light absorption layer 12. In FIG. 2, E1 represents the bandgap energy of the light absorption layer 12, and E2 represents the bandgap energy of the well layer 18. The wavelengths $\lambda_1$ and $\lambda_2$ corresponding to the respective bandgaps are represented by $\lambda_1 = hc/E1$ and $\lambda_2 = hc/E2$, respectively, where E2 is smaller than E1 (i.e., E2<E1) and therefore $\lambda_1$ is shorter than $\lambda_2$ (i.e., $\lambda_1 < \lambda_2$).

Referring to FIGS. 1 and 2, an operation of the semiconductor optical modulator 10 according to Embodiment 1 is described. A CW light beam L1, which is an incident light beam, having a wavelength of $\lambda_1$ is inputted to one facet of the optical modulator 10, and a modulated light beam Lout, which is an outgoing light beam, having a wavelength of A is thereby outputted from the other opposite surface of the optical modulator 10. At the same time, a pumping light beam L2 having a wavelength of $\lambda_2$ corresponding to the bandgap energy E2 of the well layer 18 is also inputted to the same incident facet together with the CW light beam L1 in the optical modulator 10.

At the same time, a constant voltage of, e.g., 3V or so is applied in the reverse direction between the anode electrode 16 and the cathode electrode 17 in the optical modulator 10. The voltage application causes the Franz-Keldysh effect so that the effective bandgap of the light absorption layer 12 becomes smaller and the absorption coefficient with respect to longer wavelengths than the bandgap wavelength becomes greater. Base on the change in the absorption coefficient under the voltage application, the light intensity is modulated to thereby generate the modulated light beam Lout having a wavelength of $\lambda_1$.

By absorbing the incident CW light beam L1, carriers of the electron and hole pairs are generated in the light absorption layer 12 and accumulated therein. These carriers are more accumulated in the well layer 18 having a lower energy level (potential). The well layer 18 is formed of a release part 18a having a function of releasing the carriers accumulated in the well layer 18 to the outside of the optical modulator. By this arrangement, the carriers accumulated in the well layer 18 are excited by the input of the pumping light beam L2 having substantially the same energy as the energy level of the well layer 18, and the carriers are released from the carrier release part 18a to the outside, so that the density of the accumulated carriers is reduced. At the same time, an induced emission light beam having a wavelength of $\lambda_1$ is generated by the guide and release of the carriers from the well layer 18. The induced emission light beam generated by the pumping light beam is intruded into the modulated light beam (Lout) outgoing from the output facet of the modulator, and therefore the intensity of the induced emission light beam is made low enough with respect to the modulated light beam Lout.

In this way, the carriers generated in the light absorption layer 12 are consumed by the guide and release thereof through the well layer 18, so that few carriers are accumulated in the light absorption layer 12. Thus, by preventing the carriers from screening, the applied electric field can hardly be attenuated. The relaxation time for the guide and release of the carriers from the well layer 18 is about 0.1 ps. Thus, the response can be established at 100 GHz or higher, which is high enough for the optical communication having a response speed of 40 Gbit/s.

According to Embodiment 1, even when an incident light beam with a high intensity of 20 mW or more is input, the carriers generated in the light absorption layer 12 can be guided and released from the well layer 18 at high speed, so that the extinction characteristics at high frequency can be prevented from deteriorating in the semiconductor optical modulator.

In Embodiment 1, although a DC voltage is applied to the optical modulator 10, it is not limited to this, and signals for sampling, waveform shaping, noise silencing, and the like may be superimposed on the applied voltage.
(Embodiment 2)

Figure 3:
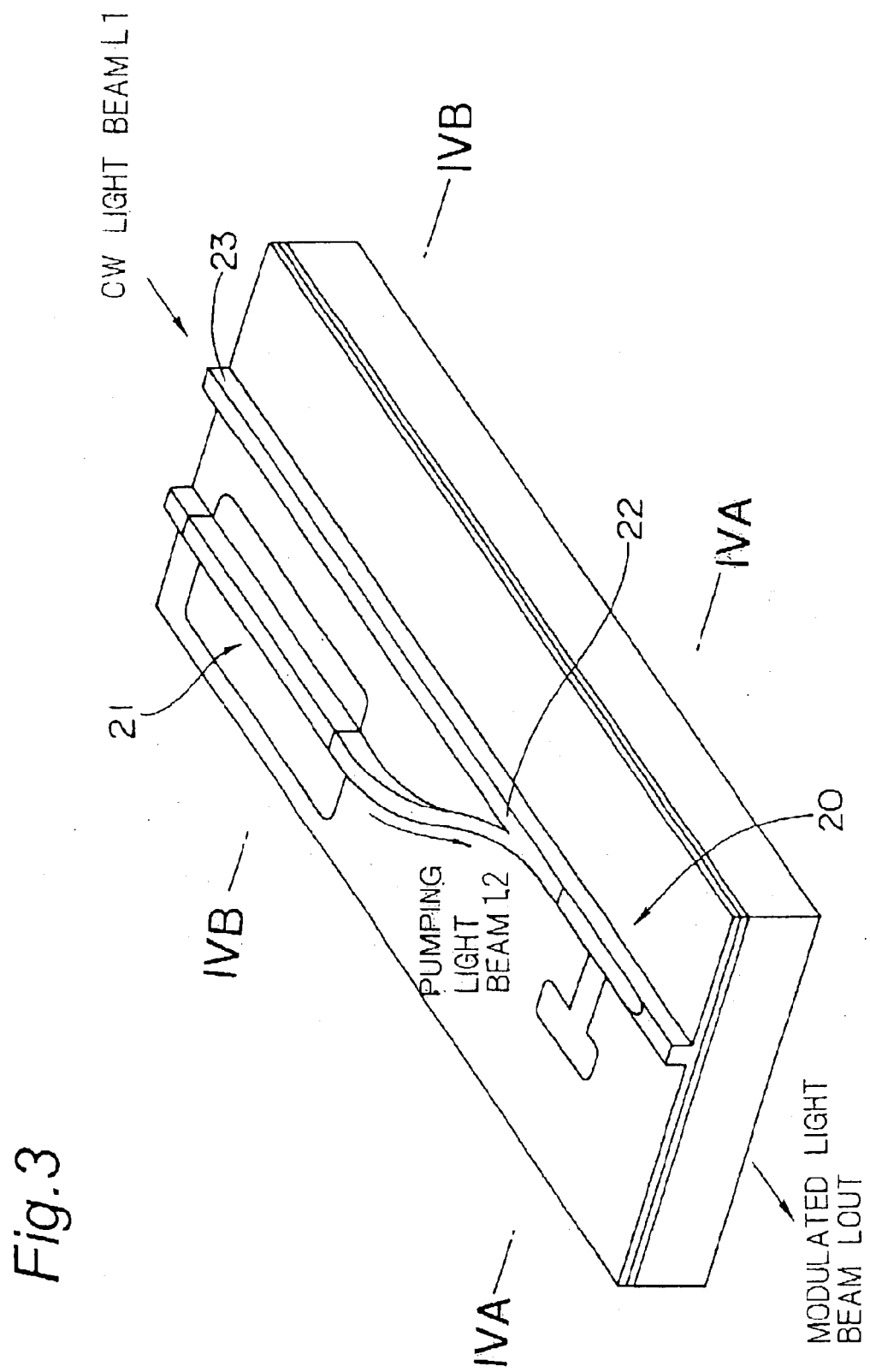
FIG. 3 is a perspective view schematically showing an entire structure of an integrated semiconductor optical device according to Embodiment 2 of the present invention.
Figure 4A:
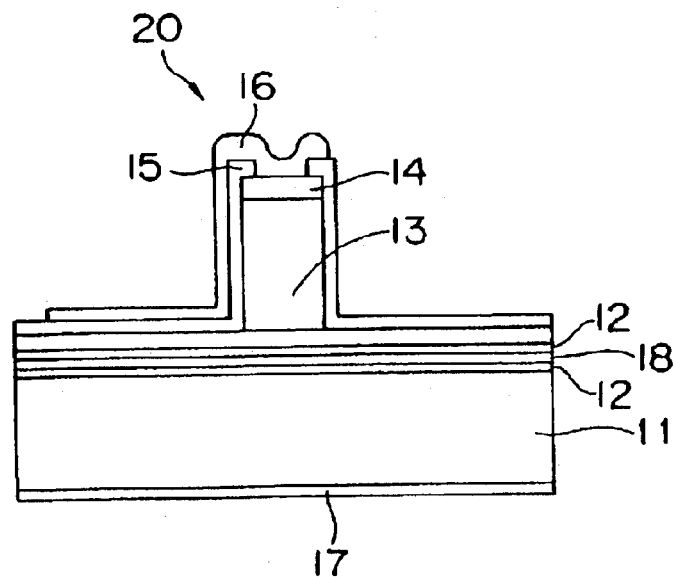
FIGS. 4A and 4B are cross-sectional views along the cutting-plane lines IVA–IVA' and IVB—IVB' shown in FIG. 3, respectively.
Figure 4B:
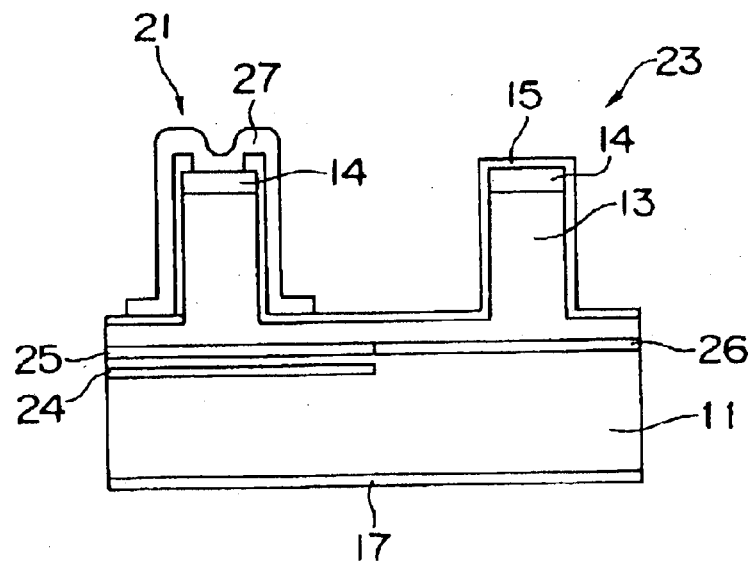

Referring to FIG. 3, and FIGS. 4A and 4B, Embodiment 2 of the present invention is described below. In Embodiment 2, the semiconductor optical modulator of Embodiment 1 is monolithically integrated with a DFB laser on the same semiconductor chip substrate. The DFB laser is used as a light source for generating the pumping light beam. FIG. 3 is a perspective view schematically showing the entire structure of the integrated semiconductor optical device according to Embodiment 2. FIGS. 4A and 4B are sectional views along cutting-plane lines IVA–IVA' and IVB–IVB' as shown in FIG. 3, respectively.

In FIG. 3, reference numeral 20 represents an optical modulator portion, 21 the DFB laser for generating the pumping light beam, 22 a coupler for coupling the CW light beam L1 inputted from the outside with the pumping light beam L2, and 23 a CW light beam waveguide.

The optical modulator portion 20 shown in FIG. 4A has the same sectional structure as that of Embodiment 1 shown in FIG. 1. Specifically, on the n-conductivity type InP substrate 11, there are formed an InGaAsP light absorption layer 12, p-conductivity type InP cladding layer 13, p-conductivity type InGaAsP contact layer 14, $SiO_2$ insulating film 15, and Ti/Au anode electrode 16. The Ti/Au cathode electrode 17 is formed on the back surface of the substrate 11. The well layer 18 is formed in the light absorption layer 12 in a sandwiched manner. The bandgap energy of the well layer 18 is made smaller than that of the light absorption layer 12.

As shown in FIG. 4B, the sectional structure includes a DFB laser 21 for generating the pumping light beam; a CW light beam waveguide 23. A multiple quantum well (MQW) InGaAsP active layer 25 is formed in a part of the substrate 11 including a region under the DFB laser 21 for generating the pumping light beam. An InGaAsP light guide layer 24 with diffraction grating is formed under the active layer 25. The upper portion of the DFB laser 21 for generating the pumping light beam has a Ti/Au anode electrode 27 for the DFB laser. The anode electrode 27 is partially in contact with an upper portion of the p-conductivity type InGaAsP contact layer 14 through the insulating film 15.

In the substrate 11 including the region under the CW light beam waveguide 23, an InGaAsP core layer 26 is formed at the same depth level as that of the active layer 25. The upper portion of the p-conductivity type InGaAsP contact layer 14 is covered with the $SiO_2$ insulating film 15. InGaAsP of the core layer 26 has such a composition that the light absorption by the core layer 26 is low with respect to the used wavelength.

Referring to FIG. 3, and FIGS. 4A and 4B, the operation and the mechanism of Embodiment 2 are described. The CW light beam L1 inputted from the outside and the pumping light beam L2 generated by the DFB laser 21 in the integrated semiconductor optical device are coupled by the coupler 22 and transmitted to the optical modulator 20. The CW light beam L1 is modulated in intensity in the optical modulator 20 and outputted as the modulated light beam Lout. As described in Embodiment 1, in this operation process, the carriers generated in the light absorption layer 12 are consumed by the guide and release thereof through the well layer 18, so that few carriers are accumulated in the light absorption layer 12. Thus, the intensity-modulated light beam Lout is obtained from the output facet of the integrated semiconductor optical device.

According to Embodiment 2, even when an incident light beam with a high intensity of 20 mW or more is inputted, the carriers generated in the light absorption layer 12 can be guided and released from the well layer 18 at high speed. Thus, the semiconductor optical modulator can be free from deterioration of the extinction characteristics at high frequency. In addition, the light source for generating the pumping light beam and the optical modulator are monolithically integrated on the same substrate so that the semiconductor optical device can be reduced in size and manufacturing cost.
(Embodiment 3)

Figure 5:
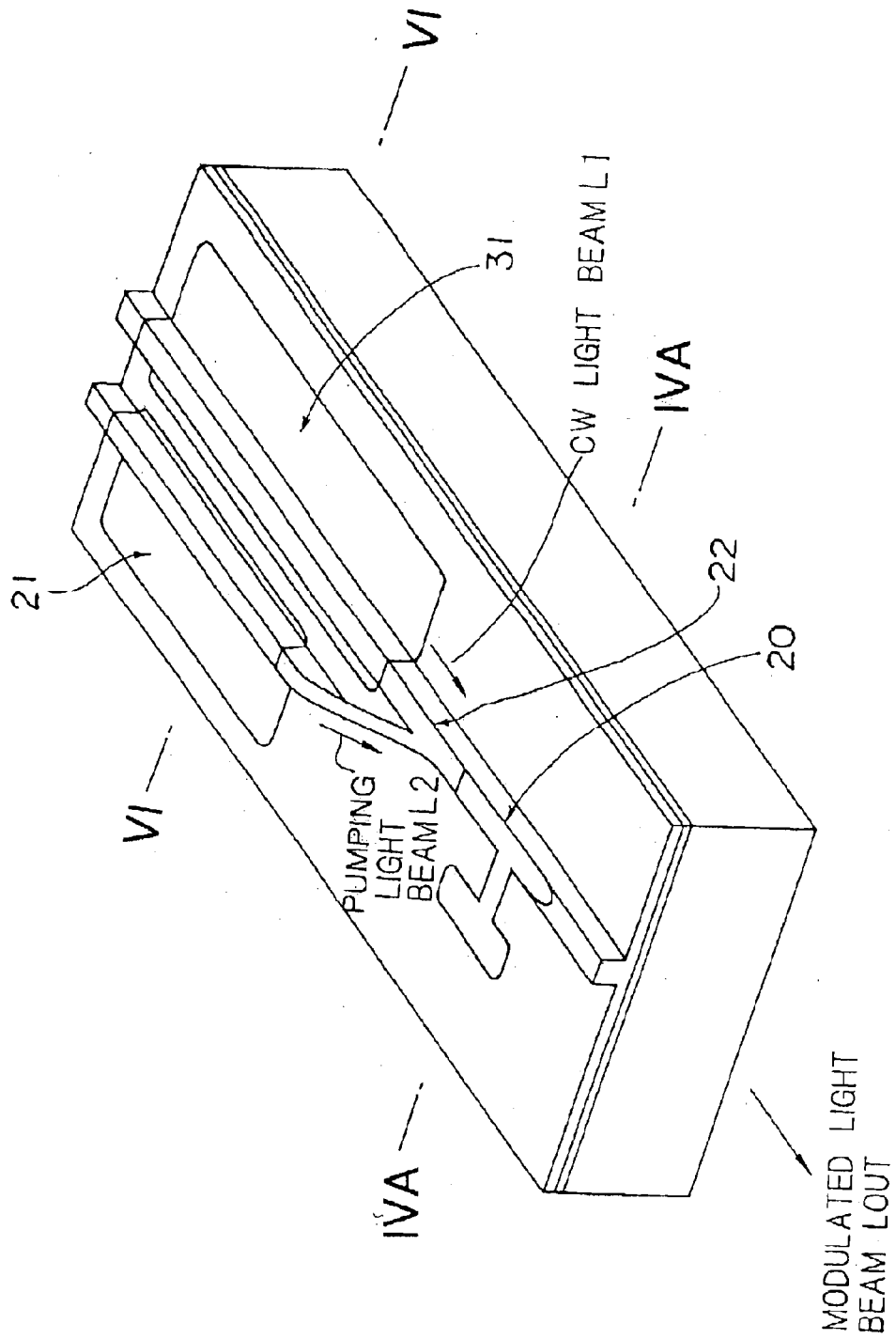
FIG. 5 is a perspective view schematically showing an entire structure of an integrated semiconductor optical device according to Embodiment 3 of the present invention.
Figure 6:
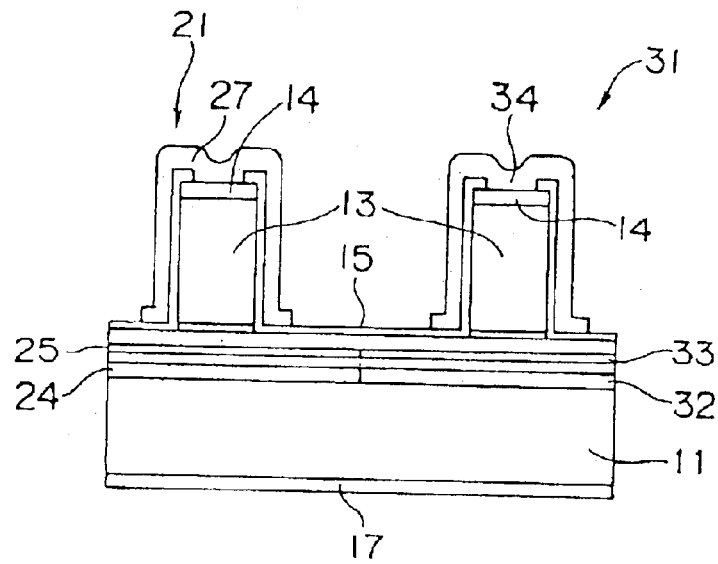
FIG. 6 is a cross-sectional view along the cutting-plane line VI—VI shown in FIG. 5.

Referring to FIGS. 5 and 6, Embodiment 3 of the present invention is described below. In Embodiment 3, the semiconductor optical modulator of Embodiment 2 is monolithically integrated with semiconductor optical elements such as a DFB laser for generating the pumping light beam and a DFB laser for generating the CW light beam on the same semiconductor chip substrate. FIG. 5 is a perspective view schematically showing the entire structure of the integrated semiconductor optical device according to Embodiment 3. FIG. 6 is a sectional view along the cutting-plane line VI—VI shown in FIG. 5. The sectional structure along the cutting-plane line IVA—IVA' shown in FIG. 5 is the same as that of Embodiment 2 shown in FIG. 4A and therefore omitted from the description.

In FIG. 5, reference numeral 20 represents the optical modulator portion, 21 the DFB laser for generating the pumping light beam, 22 the coupler for coupling the CW light beam L1 with the pumping light beam L2 passing through the inside of the chip device, and 31 the DFB laser for generating the CW light beam.

As shown in FIG. 6, the sectional structure includes the DFB laser 21 for generating the pumping light beam; the DFB laser 31 for generating the CW light beam; the multiple quantum well (MQW) InGaAsP active layer 25 formed in the substrate 11 including the region under the DFB laser 21 for generating the pumping light beam; and the InGaAsP light guide layer 24 with diffraction grating formed under the active layer 25. The DFB laser 21 for generating the pumping light beam has a Ti/Au anode electrode 27 for the DFB laser. The electrode 27 is partially in contact with the upper portion of the p-conductivity type InGaAsP contact layer 14 through the insulating film 15.

In a part of the substrate 11 including the region under the DFB laser unit 31 for generating the CW light beam, a multiple quantum well (MQW) InGaAsP active layer 33 is formed, and an InGaAsP light guide layer 32 with diffraction grating is formed under the active layer 33. A Ti/Au anode electrode 34 for the DFB laser is formed so as to be partially in contact with the upper portion of the p-conductivity type InGaAsP contact layer 14 through the $SiO_2$ insulating film 15.

Referring to FIGS. 5 and 6, the operation and the mechanism of Embodiment 3 are described below. The CW light beam L1 generated by the DFB laser 31 and the pumping light beam L2 generated by the DFB laser 21 are coupled in the coupler unit 22 and transmitted to the optical modulator portion 20. The CW light beam L1 is modulated in intensity in the optical modulator portion 20 and output as the modulated light beam Lout. In this modulation and operation process, the carriers generated in the light absorption layer 12 are consumed by the guide and release thereof through the well layer 18 as described in Embodiment 1, so that few carriers are accumulated in the light absorption layer 12. As described above, the intensity-modulated light beam Lout is obtained from the output facet.

According to Embodiment 3, even when an incident light beam with a high intensity of 20 mW or more is inputted, the carriers generated in the light absorption layer 12 can be released from the well layer 18 at high speed. Thus, the semiconductor optical modulator can be free from the deterioration of the extinction characteristics at high frequency. In addition, the light sources for generating the CW and pumping light beams are monolithically integrated with the optical modulator on the same substrate so that the semiconductor optical device can be reduced in size and manufacturing cost.

(Embodiment 4)

In Embodiment 4, the semiconductor optical modulator having the feature as described in Embodiment 1 further includes a Fabry-Perot resonator structure in which two plane reflection films are respectively formed on the facets of the modulator in an opposed manner so that the light confinement and the release of the carriers can be facilitated.

Figure 7:
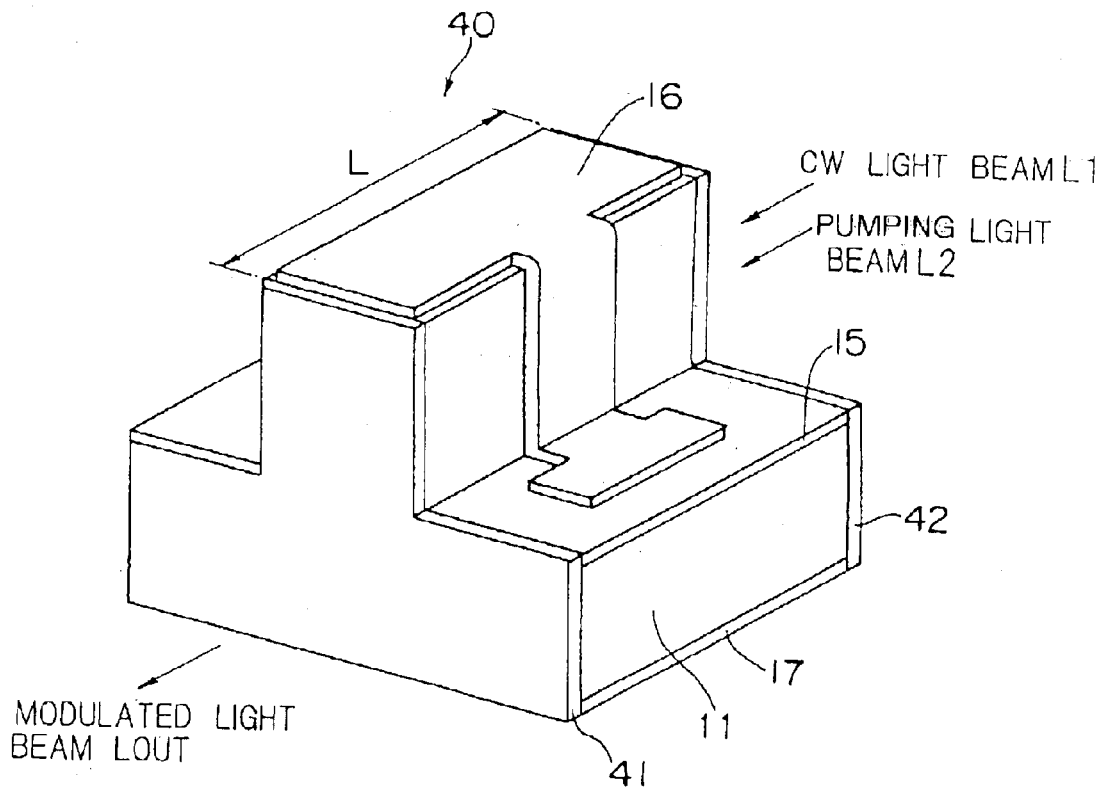
FIG. 7 is a perspective view schematically showing a structure of the electroabsorption type semiconductor optical modulator according to Embodiment 4 of the present invention.
Figure 8:
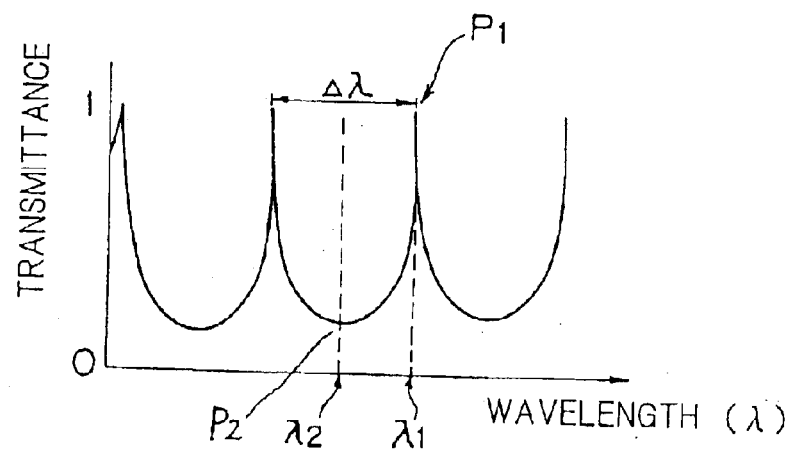
FIG. 8 is a graph showing a relationship between an incident light wavelength and a transmittance in the Fabry-Perot resonator structure of the Embodiment 4 according to the present invention.

Referring to FIGS. 7 and 8, Embodiment 4 is described below. FIG. 7 is a perspective view schematically showing a structure of the electroabsorption type semiconductor optical modulator 40 according to Embodiment 4. FIG. 8 is a graph showing a relationship between the incident light wavelength and the transmittance in the Fabry-Perot resonator structure of the Embodiment 4.

In general, if a light beam having a frequency of ν and a unit intensity is let in the Fabry-Perot resonator structure from the outside at right angles to the reflection film, the incident light beam is repeatedly reflected between the two reflection films and undergoes multiple interference. The light beam passing through the optical modulator with such a resonator structure periodically changes in intensity depending on the light frequency ν and has a peak with an intensity of 1 at a specific light frequency (that is the resonance light frequency).

Specifically, as shown in FIGS. 7 and 8, in the structure including the optical modulator having a length of L and an effective refractive index of n, the wavelength $\lambda_1$ of the CW light beam L1 is set at or near the wavelength of the peak transmittance (P1), and the wavelength $\lambda_2$ of the pumping light beam L2 is set at or near the wavelength of the minimum transmittance (P2). Both wavelengths are within the transmission range of the Fabry-Perot resonator. Such a transmission range is determined by the reflection films and the length of the optical modulator. In this case, the distance ($\Delta\lambda$) between the peak transmittance wavelengths is obtained as $\lambda^2/nL$.

In FIG. 7, reference numerals 41 and 42 represent multilayered reflection films each formed by stacking $SiO_2$ and silicon layers on each of the light exit and entrance surfaces in the optical modulator 40. The CW light beam L1 is less reflected in the Fabry-Perot resonator and therefore the modulated light beam can efficiently be outputted. On the other hand, the pumping light beam L2 is allowed to resonate in the optical modulator and therefore the carriers can efficiently be guided and released.

According to Embodiment 4, even when an incident light beam having a high intensity of 20 mW or more is inputted, the semiconductor optical modulator can be free from deterioration of the extinction characteristics at high frequency. In addition, the intensity of the pumping light beam outgoing from the output facet of the optical modulator is lower than that of the modulated light beam, so that the wavelength filter attached outside can be simple and the semiconductor optical device can be reduced in cost.

(Embodiment 5)

Figure 9:
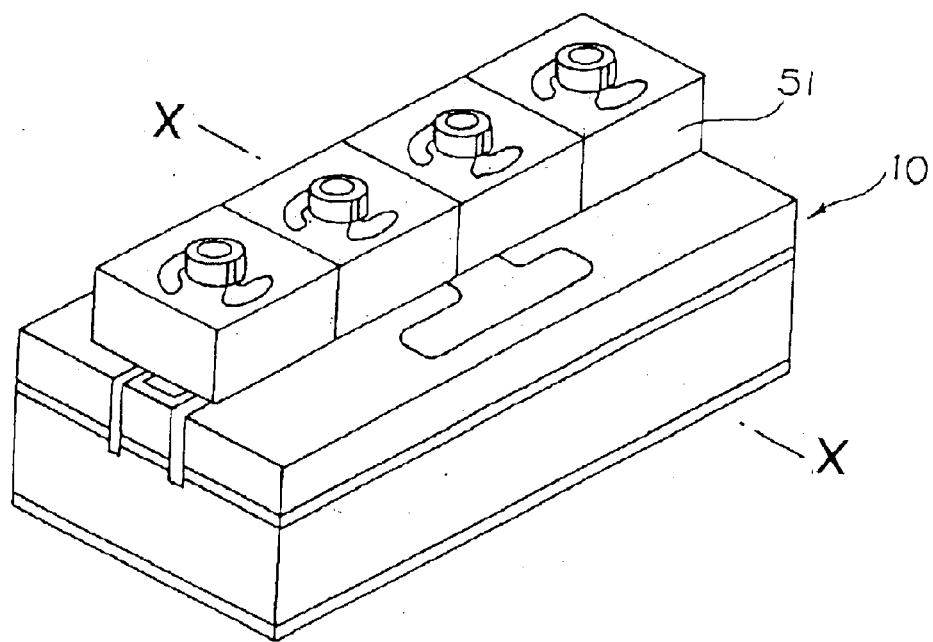
FIG. 9 is a perspective view showing an entire structure of the semiconductor optical device according to Embodiment 5 of the present invention.
Figure 10:
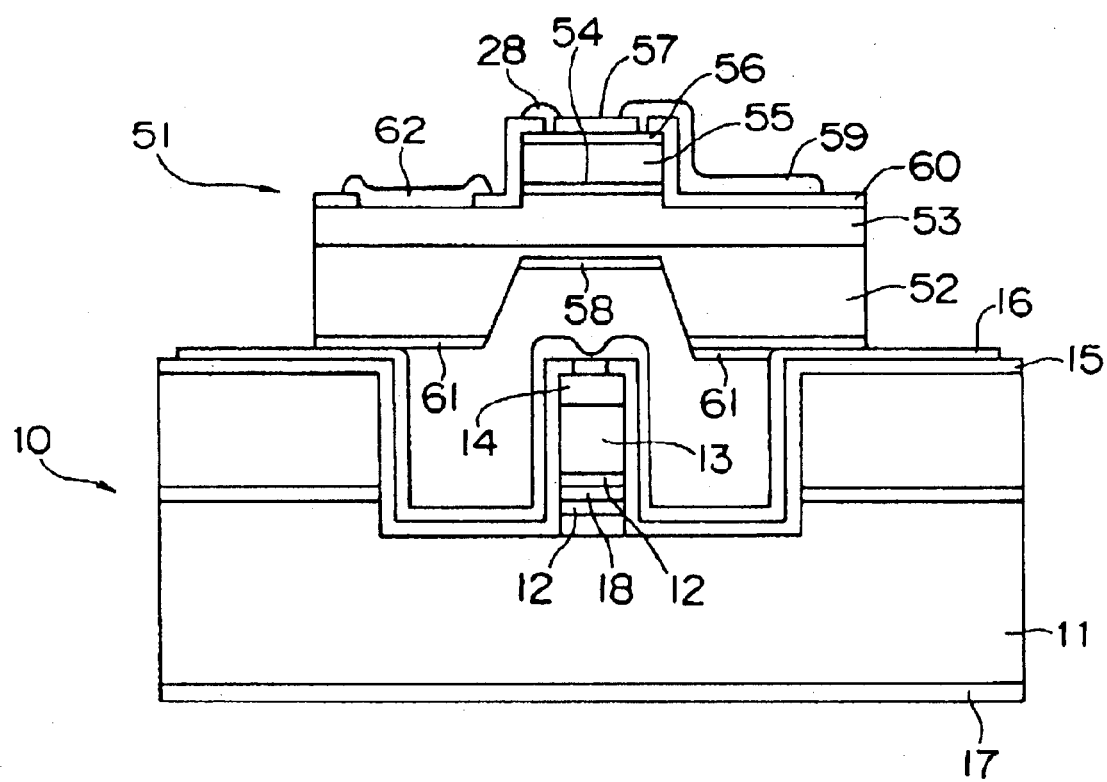
FIG. 10 is a cross-sectional view along the cutting-plane line X—X shown in FIG. 9.

Referring to FIGS. 9 and 10, Embodiment 5 of the present invention is described below. Embodiment 5 including the feature of Embodiment 1 is characterized in that a surface-emitting laser, preferably a surface-emitting laser array is used as the light source for generating the pumping light beam, and the array of the surface-emitting lasers is placed on an upper portion of the optical modulator. FIG. 9 is a perspective view showing the entire structure of the semiconductor optical device according to Embodiment 5, and FIG. 10 is a sectional view along the cutting-plane line X—X as shown in FIG. 9.

In FIGS. 9 and 10, reference numeral 51 represents a surface-emitting laser array placed on the upper portion of the optical modulator 10. In FIG. 10 showing the sectional structure of each surface-emitting laser, reference numeral 52 represents a semi-insulating InP substrate, 53 an n-conductivity type InP cladding layer, 54 an InGaAsP active layer, 55 a p-conductivity type InP cladding layer, 56 a p-conductivity type InGaAsP contact layer, 57 and 58 each a multilayered reflection film of stacked $TiO_2/SiO_2$, 59 a Ti/Au anode electrode, 60 a $SiO_2$ insulating film, 61 Ti/Au die bonding metal, and 62 a Ti/Au cathode electrode.

Referring to FIGS. 9 and 10, the operation and mechanism of Embodiment 5 is described in the following. When forward current is applied between the anode electrode 59 and the cathode electrode 62 in each surface-emitting laser 51, a laser beam is emitted from the back surface of the substrate 52. The emitted laser beam is used as the pumping light beam L2 and applied to the light absorption layer 12 of the-optical modulator 10, so that the carriers accumulated in the well layer 18 formed in the light absorption layer 12 are guided and released. The travelling direction of the pumping light beam L2 intersects with those of the CW light beam L1 and the modulated light beam Lout substantially at right angles. Thus, the intensity of the pumping light beam outgoing from the output facet of the modulator can be further reduced.

According to Embodiment 5, even when an incident light beam having a high intensity of 20 mW or more is inputted, the semiconductor optical modulator can be free from deterioration of the extinction characteristics at high frequency. In addition, the intensity of the pumping light beam outgoing from the output facet of the optical modulator is lower than that of the modulated light beam so that the wavelength filter attached outside can be simple and the semiconductor optical device can be reduced in cost.

(Embodiment 6)

Figure 11:
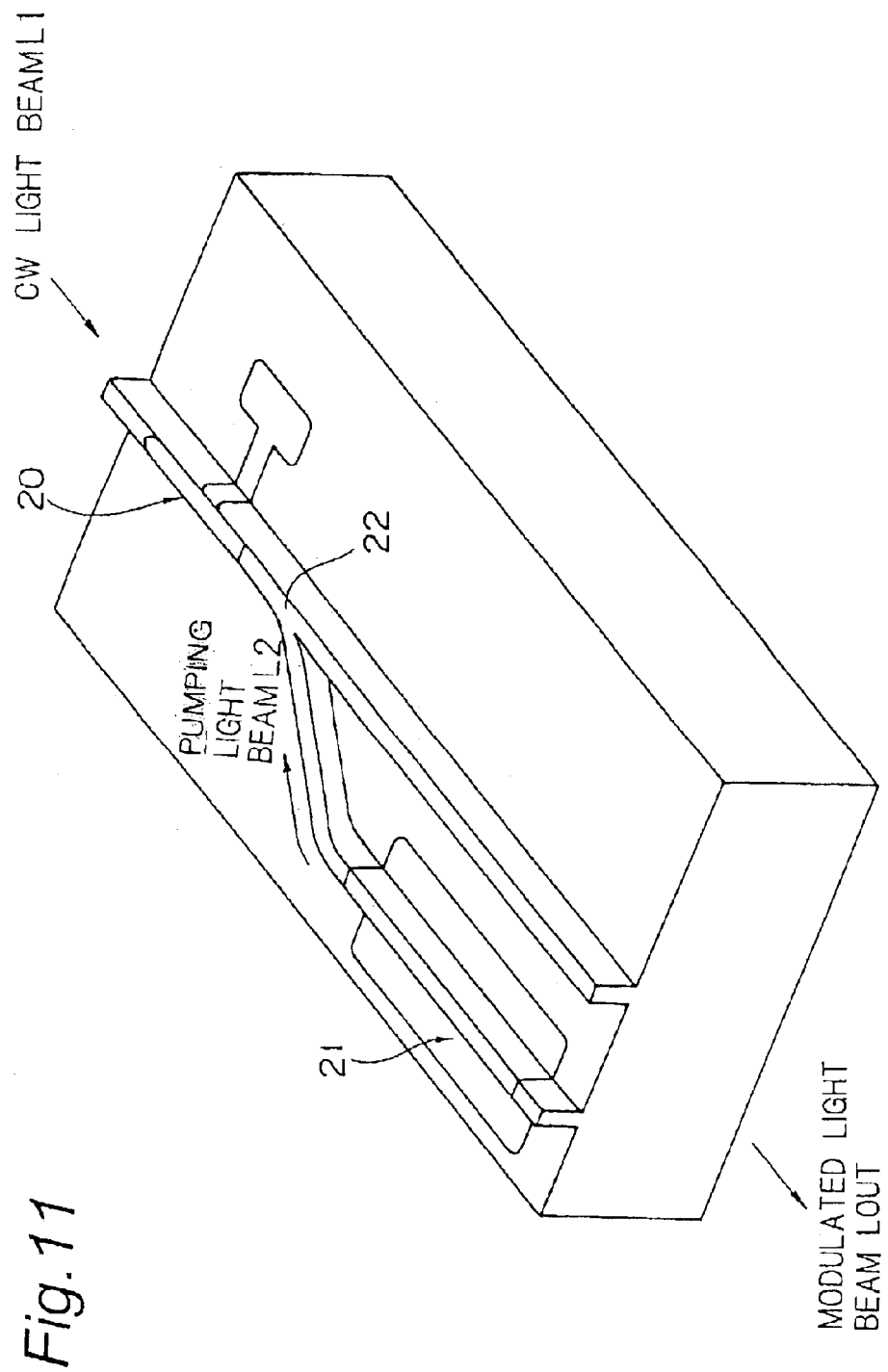
FIG. 11 is a perspective view showing an entire structure of the integrated semiconductor optical device according to Embodiment 6 of the present invention.

Referring to FIG. 11, Embodiment 6 of the present invention is described in the following. In a similar manner to Embodiment 2, Embodiment 6 includes the semiconductor optical modulator and the DFB laser used as the light source for generating the pumping light beam wherein they are monolithically integrated on the same semiconductor chip substrate. Embodiment 6 differs from Embodiments 2 in that the DFB laser 21 for generating the pumping light beam is integrated and arranged in such a manner that the travelling direction of the pumping light beam L2 outputted from the DFB laser 21 is opposite to that of the CW light beam L1. FIG. 11 is a perspective view showing the entire structure of the integrated semiconductor optical device according to Embodiment 6. The operation is similar to that as described in Embodiment 2 and therefore omitted from the description.

According to Embodiment 6, the output pumping light beam is hardly reflected in the direction of the output modulated light beam Lout at the coupler portion 22, which couples the pumping and CW light beams. Thus, the intensity of the intruded pumping light beam in the output modulated light beam can further be reduced as compared with Embodiment 2.

According to Embodiment 6, even when an incident light beam having a high intensity of 20 mW or more is inputted, the semiconductor optical modulator can be free from deterioration of the extinction characteristics at high frequency. In addition, the intensity of the pumping light beam outgoing from the output facet of the optical modulator is lower than that of the modulated light beam, so that the wavelength filter attached outside can be simple and the semiconductor optical device can be reduced in cost.

(Embodiment 7)

Figure 12:
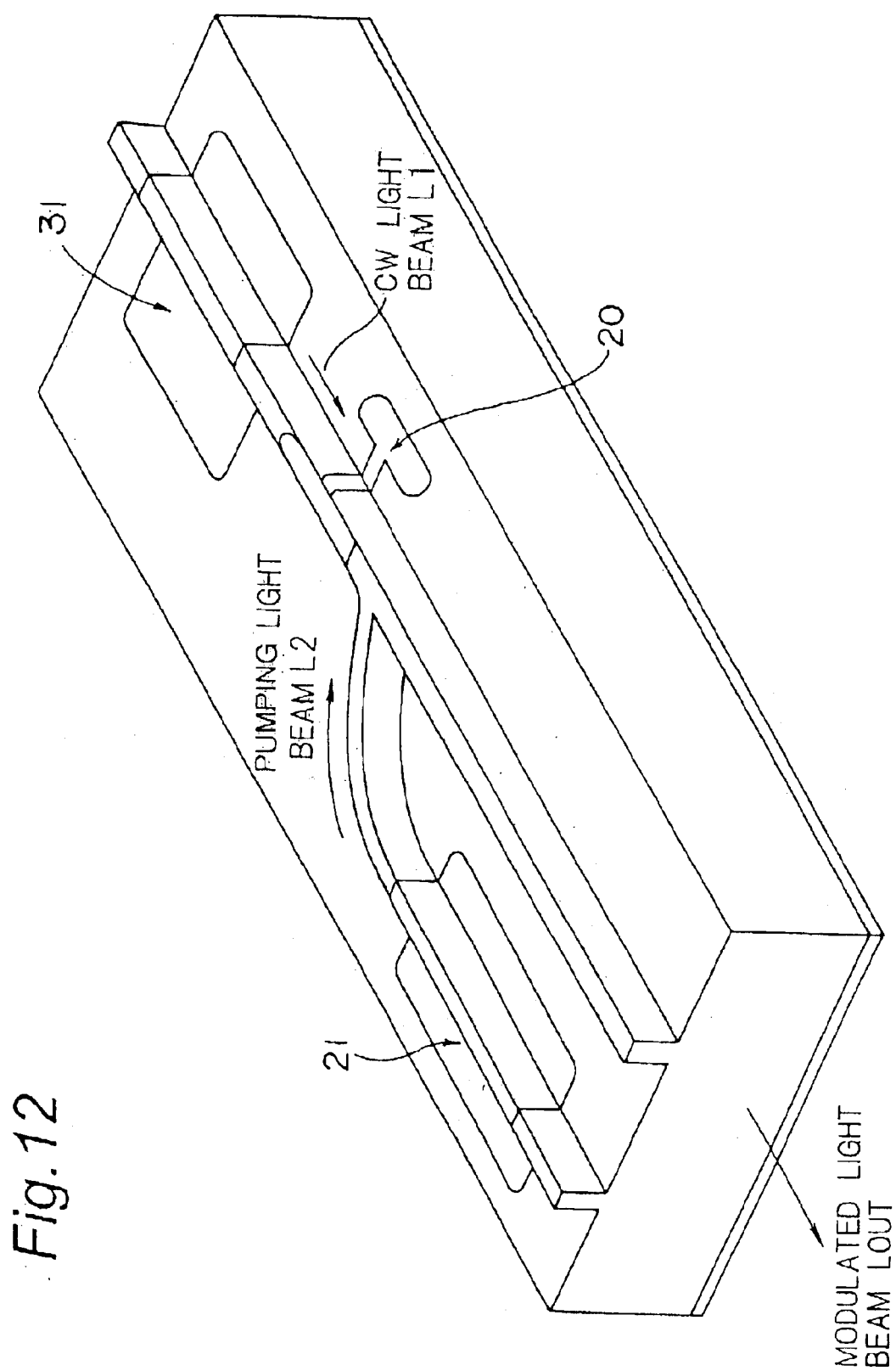
FIG. 12 is a perspective view showing an entire structure of the integrated semiconductor optical device according to Embodiment 7 of the present invention.

Referring to FIG. 12, Embodiment 7 of the present invention is described below. In a similar manner to Embodiment 3, Embodiment 7 includes the semiconductor optical modulator 20, DFB laser 21 used as the light source for generating the pumping light beam, and DFB laser 31 used as the light source for generating the CW light beam, wherein they are monolithically integrated on the same semiconductor chip substrate.

In a similar manner to Embodiment 6, Embodiment 7 differs from Embodiment 3 in that the DFB laser 21 for generating the pumping light beam is integrated and arranged in such a manner that the travelling direction of the pumping light beam L2 from the laser 21 is opposite to that of the CW light beam L1. FIG. 12 is a perspective view showing the entire structure of the integrated semiconductor optical device according to Embodiment 7. The operation is similar to that as described in Embodiment 3 and therefore omitted from the description.

According to Embodiment 7, the output pumping light beam is hardly reflected in the direction of the output modulated light beam Lout at the coupler portion 22, which couples the pumping and CW light beams. Thus, the intensity of the intruded pumping light beam in the output modulated light beam can be further reduced as compared with Embodiment 3.

According to Embodiment 7, even when an incident light beam having a high intensity of 20 mW or more is inputted, the semiconductor optical modulator can be free from deterioration of the extinction characteristics at high frequency. In addition, the intensity of the pumping light beam outgoing from the output facet of the optical modulator is lower than that of the modulated light beam, so that the wavelength filter attached outside can be simple and the semiconductor optical device can be reduced in cost.

(Embodiment 8)

According to Embodiments 1 to 7, electroabsorption type optical modulators are provided based on the Franz-Keldysh effect. The present invention is not limited to such modulators. The present invention is also directed to other absorption type optical modulators having a function of forcefully discharging the carries, which are generated in the optical modulator by the light absorption, with an electric field generated in the optical modulator by externally applied voltage. For example, waveguide type multiple quantum well (MQW) optical modulators may be provided based on the quantum Stark effect of the semiconductor MQW.

Figure 13:
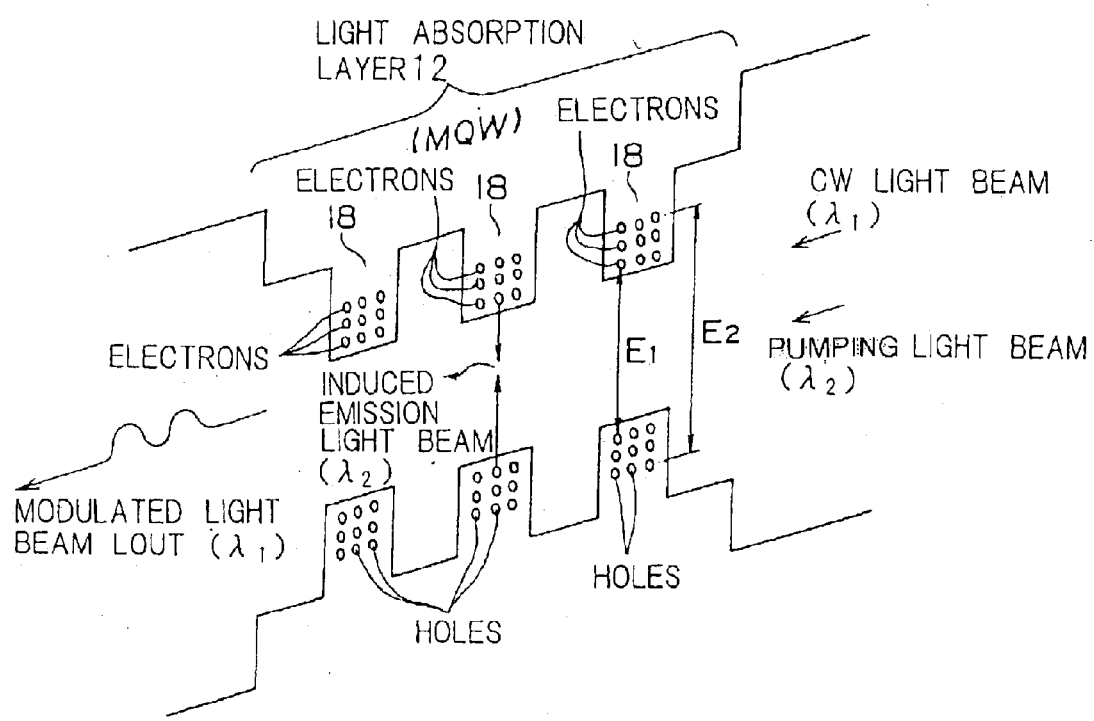
FIG. 13 is a schematic diagram showing an energy bandgap model of a portion near the light absorption layer in the electroabsorption type semiconductor optical modulator according to Embodiment 8 of the present invention.
Figure 14:
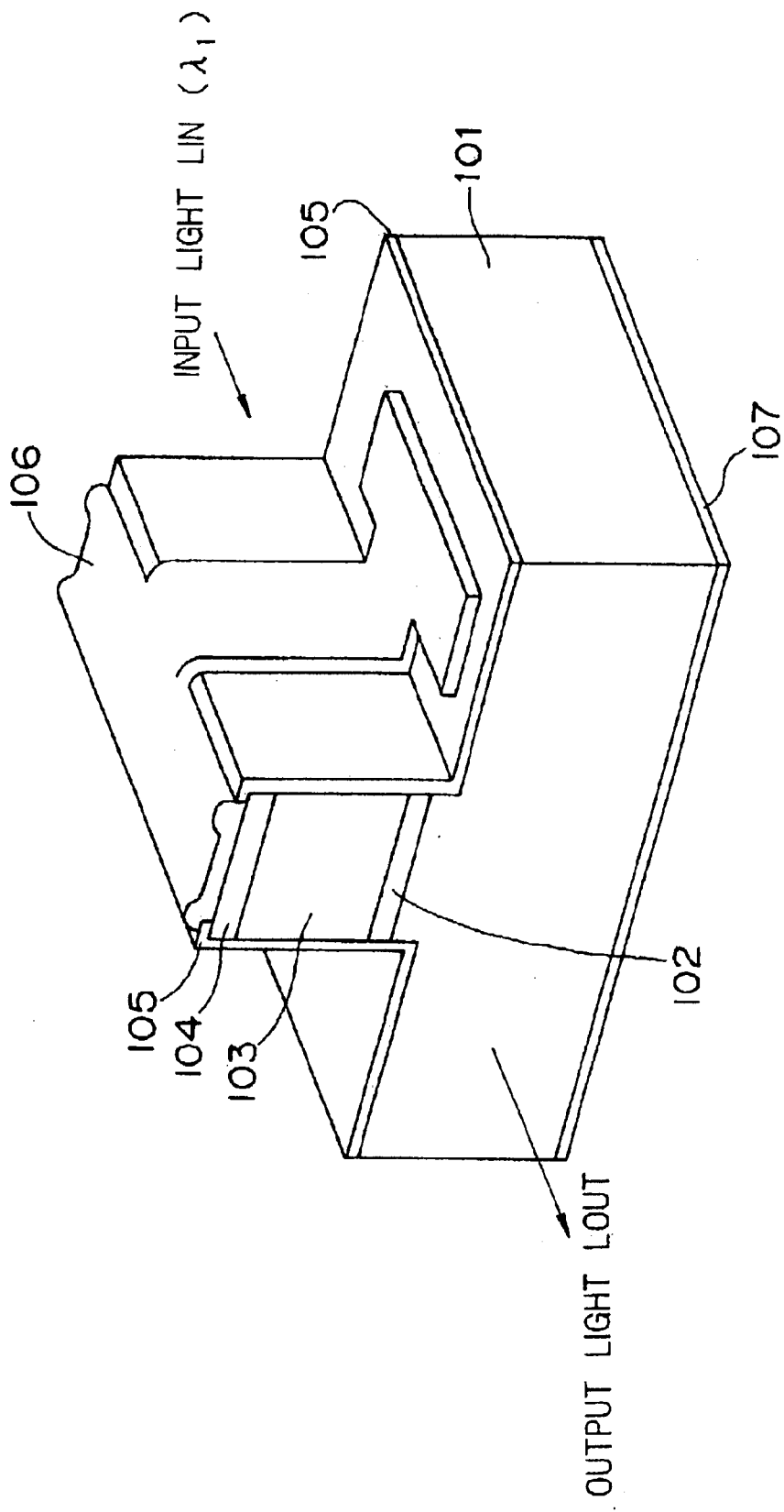
FIG. 14 is a perspective view schematically showing a conventional electroabsorption type semiconductor optical modulator.
Figure 15:
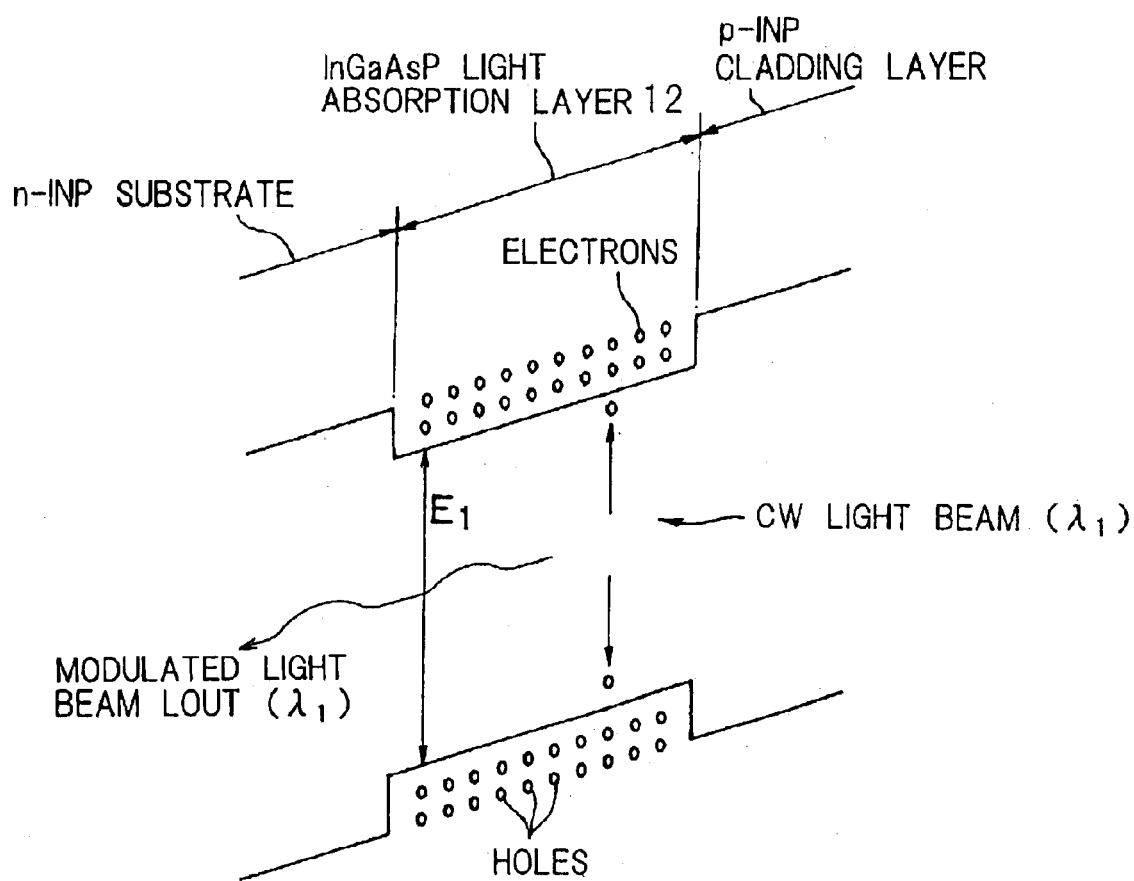
FIG. 15 is a schematic diagram showing an energy bandgap model of a portion near the conventional light absorption layer shown in FIG. 14.

Referring to FIG. 13, Embodiment 8 is directed to the electroabsorption type optical modulator based on the quantum confined Stark effect. FIG. 13 is a schematic diagram showing an energy bandgap model of the portion near the light absorption layer in the electroabsorption type semiconductor optical modulator according to Embodiment 8. As shown in FIG. 13, in Embodiment 8, the light absorption layer 12 has an InGaAsP multiple quantum well (MQW) structure. In the electroabsorption type optical modulator based on the quantum confined Stark effect, the carriers generated by the light absorption are accumulated in the multiple quantum well (MQW) layers 18 formed in the light absorption layer 12.

In order to prevent the increase of the carrier density, the used pumping light beam has a wavelength of $\lambda 2$ $(=hc/E2)$ which is shorter than the applied wavelength $\lambda 1$ $(=hc/E1)$. In Embodiment 8, $\lambda 2$ is shorter than $\lambda 1$ $(\lambda 1 > \lambda 2)$, and the energy of the pumping light beam is higher than that of the applied input CW light beam, namely E1<E2. By use of such a pumping light beam, a part of the carriers accumulated in each well layer 18 is guided and released to be consumed when such a part of the carriers is at a higher energy level than the pumping light energy E2.

By such a mechanism, all the carriers existing in each well layer are at a lower energy level than that of the pumping light beam, so that the carrier density can be kept constant regardless of the intensity of the input CW light.

According to Embodiment 8, the electroabsorption type semiconductor optical modulator can always provide constant extinction characteristics regardless of the intensity of the incident light. In addition, even when a light beam with a high intensity of 20 mW or more is inputted, the semiconductor optical modulator can be free from deterioration of the extinction characteristics at high frequency.

In Embodiment 8, the light absorption layer includes the multiple quantum well (MQW) structure so that the electroabsorption type optical modulator is based on the quantum confined Stark effect. Alternatively, the light absorption layer may be made of bulk crystal. In such a case, the band edge shift under the applied voltage is based on the Franz-Keldysh effect.

As described above, according to the present invention, even when an incident light beam having a high intensity of 20 mW or more is input, the carriers generated in the light absorption layer can be released from the well layer at high speed, so that the semiconductor optical modulator can be free from deterioration of the extinction characteristics at high frequency. In the case that the light sources for generating the CW and pumping light beams are monolithically integrated with the optical modulator on the same substrate, the semiconductor optical device can be reduced in size and manufacturing cost.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A semiconductor electroabsorption optical modulator for modulating an incident light beam by changing absorption coefficient in response to application of an external voltage, comprising:

an incident facet for receiving an incident light beam, having a first wavelength, to be modulated;

an output facet for outputting a modulated light beam;

a light absorption layer, on a semiconductor substrate, for absorbing the incident light beam and, in response, generating charge carriers;

a carrier accumulation portion for accumulating the charge carrier generated; and a carrier release portion including a well layer in the light absorption layer and having a bandgap energy, for guiding and releasing the charge carriers accumulated, wherein the carrier release portion releases the charge carriers accumulated in the well layer upon receipt of an incident excitation light beam having a second wavelength, corresponding to the bandgap energy of the well layer.

2. The semiconductor optical modulator according to claim 1, wherein the light absorption layer has a bandgap energy, the bandgap energy of said well layer is smaller than the bandgap energy of said light absorption layer, and the excitation light beam has substantially the same energy level as said well layer.

3. The semiconductor optical modulator according to claim 1, comprising a Fabry-Perot resonator structure which includes a waveguide between the incident facet and the output facet, which are opposed to each other, and including an anti-reflection film on each of the incident facet and the output facet, and wherein transmittance of the modulated light beam is higher than transmittance of the excitation light beam.

4. The semiconductor optical modulator according to claim 1, wherein the excitation light beam has a wavelength shorter than wavelength the modulated light beam, and, when the excitation light beam is applied to the light absorption layer, a part of the charge carriers accumulated in the well layer is released, the part having a higher energy level than the excitation light beam.

5. A semiconductor optical device comprising:

a semiconductor substance;

an excitation light generating semiconductor laser for generating an excitation light beam, on the semiconductor substrate, a semiconductor electroabsorption optical modulator integrated on the semiconductor substrate for modulating an incident light beam by changing absorption coefficient in response to application of an external voltage, the optical modulator comprising:

an incident facet for receiving an incident light beam, having a first wavelengths to be modulated;

an output facet, opposed to the incident facet, for outputting a modulated light beam;

a light absorption layer, on the semiconductor substrate, for absorbing the incident light beam and, in response, generating charge carriers;

a charge carrier accumulation portion for accumulating the charge carriers generated; and a charge carrier guide and release portion having a well layer in the light absorption layer and having a bandgap, for guiding and releasing the charge carriers accumulated outside, wherein the carrier guide and release portion guides and releases the charge carriers accumulated in the well layer upon receipt of the excitation light beam, having a second wavelength corresponding to the bandgap energy of the well layer.

6. The semiconductor optical device according to claim 5, further comprising an incident light generating semiconductor laser which is integrated on the semiconductor substrate for generating the incident light beam having the first wavelength.

7. The semiconductor optical device according to claim 5, wherein travelling direction of the modulated light beam and travelling direction of the excitation light beam are opposed to each other in the light absorption layer.

8. A semiconductor optical device, comprising:

a surface-emitting laser for emitting an excitation light beam; and a semiconductor electroabsorption optical modulator for modulating an incident light beam by changing absorption coefficient in response to an external voltage, the optical modulator comprising:

an incident facet for receiving the incident light beam, having a first wavelength, to be modulated;

an output facet, opposed to the incident facet, for outputting a modulated light beam;

a light absorption layer, on a semiconductor substrate, for absorbing the incident light beam and, in response, generating charge carriers;

a charge carrier accumulation portion for accumulating the charge carriers generated; and a charge carrier release portion having a well layer in the light absorption layer and having a bandgap energy, for guiding and releasing the charge carriers accumulated, wherein the carrier release portion guides and releases the charge carriers accumulated in the well layer upon incidence of the excitation light beam, having a second wavelength corresponding to bandgap energy of the well layer, the excitation light beam is applied to the light absorption layer; and the surface-emitting laser is disposed on the semiconductor optical modulator so the excitation beam is incident on the light absorption layer.

* * * * *

UNITED STATES PATENT AND TRADEMARK OFFICE
CERTIFICATE OF CORRECTION

PATENT NO. : 6,760,141 B2
APPLICATION NO. : 10/464450
DATED : June 1, 2004
INVENTOR(S) : Kazuhisa Takagi It is certified that error appears in the above-identified patent and that said Letters Patent is hereby corrected as shown below:

On The Title Page, Add Item [30] Foreign Application Priority Data
June 28, 2002 [JP] Japan.....2002-190158

Signed and Sealed this

Twenty-ninth Day of May, 2007

JON W. DUDAS
*Director of the United States Patent and Trademark Office*

UNITED STATES PATENT AND TRADEMARK OFFICE
CERTIFICATE OF CORRECTION

PATENT NO.         : 6,760,141 B2
APPLICATION NO.    : 10/464450
DATED              : July 6, 2004
INVENTOR(S)        : Kazuhisa Takagi It is certified that error appears in the above-identified patent and that said Letters Patent is hereby corrected as shown below:

On The Title Page, Add Item [30] Foreign Application Priority Data
June 28, 2002 [JP] Japan.....2002-190158

This certificate supersedes Certificate of Correction issued May 29, 2007.

Signed and Sealed this

Nineteenth Day of June, 2007

JON W. DUDAS
*Director of the United States Patent and Trademark Office*